METHOD OF MAKING A MAGNETIC AMPLIFIER

Filed Sept. 26, 1962 3 Sheets-Sheet 1

INVENTORS
ARMAND CIOCCIO
HERMAN M. FRAZIER

BY ATTORNEYS

METHOD OF MAKING A MAGNETIC AMPLIFIER

Filed Sept. 26, 1962 3 Sheets-Sheet 2

INVENTORS
ARMAND CIOCCIO
HERMAN M. FRAZIER

BY

ATTORNEYS.

March 2, 1965 A. CIOCCIO ETAL 3,171,191

METHOD OF MAKING A MAGNETIC AMPLIFIER

Filed Sept. 26, 1962 3 Sheets-Sheet 3

INVENTORS.
ARMAND CIOCCIO
HERMAN M. FRAZIER

BY [signature] [signature]

ATTORNEYS.

United States Patent Office 3,171,191

Patented Mar. 2, 1965

3,171,191

METHOD OF MAKING A MAGNETIC AMPLIFIER

Armand Cioccio, Wheaton, Silver Spring, Md., and Herman M. Frazier, Washington, D.C., assignors to the United States of America as represented by the Secretary of the Navy Filed Sept. 26, 1962, Ser. No. 227,118
5 Claims. (Cl. 29—155.5)
(Granted under Title 35, U.S. Code (1952), sec. 266)

This application is a continuation-in-part of application Serial No. 156,177, filed November 30, 1961, now Patent No. 3,137,823.

The invention described herein may be manufactured and used by or for the Government of the United States of America for governmental purposes without the payment of any royalties thereon or therefor.

The present invention relates to improvements in electronic amplifiers and more particularly to a basically new and improved pulse type, variable current, magnetic amplifier and method of making same. Although magnetic amplifiers per se are known in the prior art, modern military applications require magnetic amplifiers having greatly increased sensitivity, more uniform output, and much greater stability than has been provided by presently known magnetic amplifiers. The prior art also has been confronted with problems in reducing the capacitance effects and in obtaining a high input impedance. In order to meet the aforesaid requirements of modern military applications, a new concept in the basic design of pulse type magnetic amplifiers as well as new and advanced techniques in regard to the materials used, the constructional details, and the methods of assembly have been required. The subject disclosure is directed primarily to the electronic circuitry which contains a new design concept and which provides the basic advancement in this field upon which the aforementioned advanced techniques may be employed.

The general purpose is to provide a new and improved pulse type magnetic amplifier which not only embraces all of the advantages of similarly employed magnetic amplifiers of the prior art but which also provides a sensitivity of five times that provided by the prior art devices. To obtain this, the present invention contemplates a unique five winding amplifier whereby the previously unobtainable results in sensitivity, stability, and uniformity of output may be achieved.

Another object is a new and improved method of making a sensitive shock resistant pulse type magnetic amplifier.

Another object is to provide a pulse type magnetic amplifier wherein there is a substantial reduction in the capacitance effect caused by the number of windings surrounding the core.

A still further object of the present invention is the provision of a magnetic amplifier having a high input impedance.

Yet another object of the invention is to provide a magnetic amplifier requiring a very low standby power in the order of a few milliwatts.

Other objects and advantages of the invention will become more fully apparent from the following description taken with the annexed drawings which illustrate a preferred embodiment, and wherein.

Figure 6:
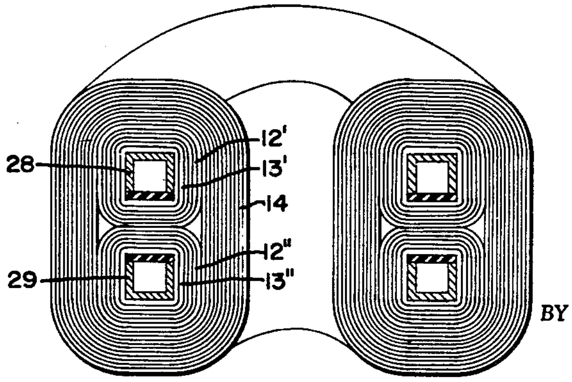
Figure 7:
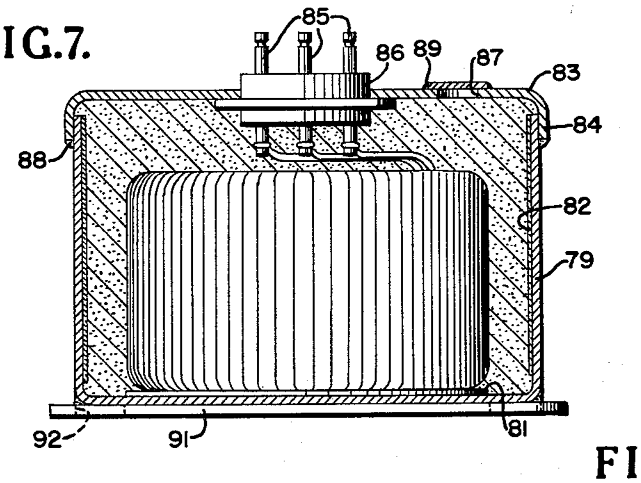
Figure 10:
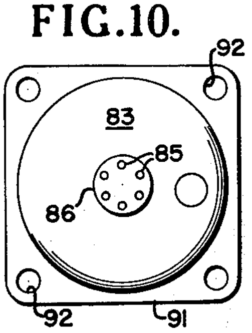
Figure 8:
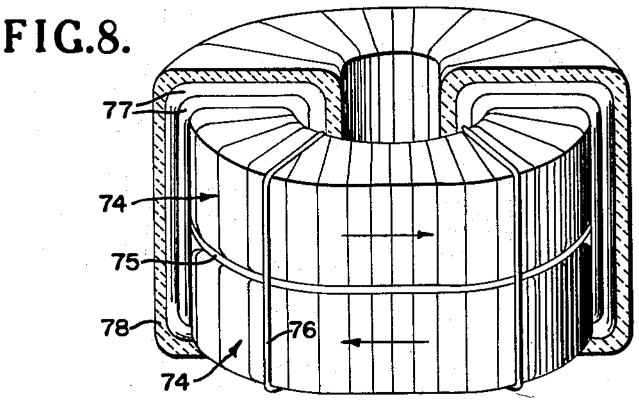
Figure 9:
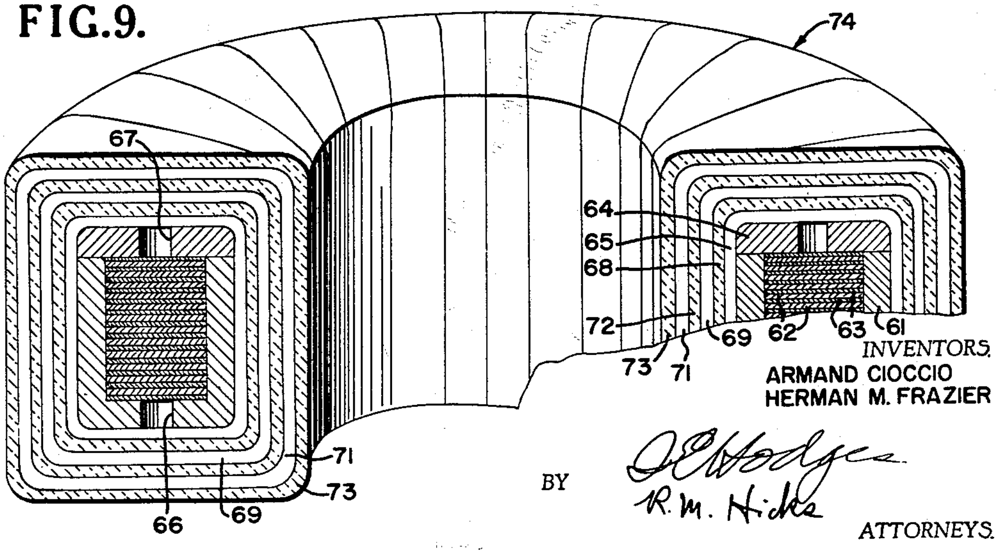

FIGS. *5a–5d* illustrate the different wave forms resulting from a single cycle signal as it appears on the various components of the system;

FIG. 6 is a simplified, cross sectional view of the magnetic amplifier showing the various windings in their proper physical relationship;

FIG. 7 is a view partially in section of the magnetic amplifier of the present invention in accordance with a preferred embodiment thereof;

FIG. 8 is an enlarged view in perspective and partially in section of a pair of toroidal transformers secured together and having a tertiary winding wound thereon;

FIG. 9 is a greatly enlarged sectional view in perspective and partially broken away of one of the transformers of FIG. 8; and FIG. 10 is a plan view greatly reduced of the device of FIG. 7.

Figures 1, 2, 3:
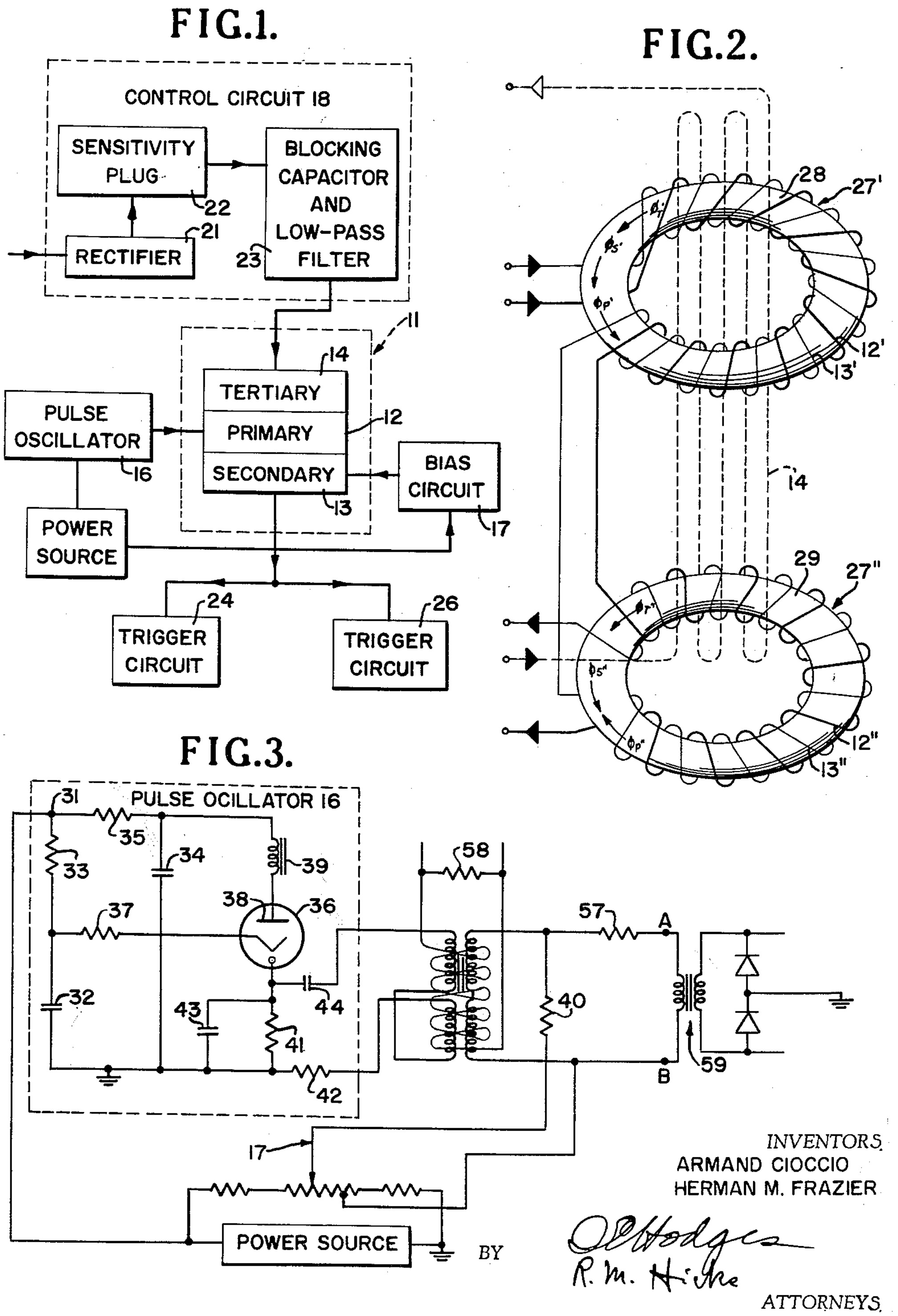
FIG. 1 is a block diagram showing the location of the magnetic amplifier in a preferred environment.
FIG. 2 is a schematic view of the magnetic amplifier showing only a small portion of the windings on each core for purposes of clarity.
FIG. 3 is a circuit diagram of the pulse oscillator and the magnetic amplifier shown in FIG. 1.

Referering now to the drawings which illustrate a preferred embodiment and wherein like reference numerals designate like parts throughout the several views, FIG. 1 shows magnetic amplifier 11 having a primary winding 12, a secondary winding 13 and a tertiary winding 14 which receive signals from pulse oscillator 16, bias circuit 17 and control circuit 18 respectively. As further shown in FIG. 1, the output from the magnetic amplifier is taken from secondary windings 13 and may be applied, for example, to one or the other of trigger circuits 24 or 26 depending upon the polarity of the output signal. Each of trigger circuits 24 and 26 contains one or more cold-cathode gas trigger tubes which are triggered into conduction by a voltage pulse applied to their grids. It is to be understood that the output from the secondary 13 of magnetic amplifier 11 may obviously be applied to other and different circuitry than trigger circuits 24, 26 which are illustrated merely as being exemplary of one particular application.

FIG. 2 shows magnetic amplifier 11 as consisting essentially of a pair of substantially identical two-winding transformers 27′ and 27″ containing highly non-linear magnetic cores 28 and 29 respectively. Primary windings 12′ and 12″ are connected in series aiding and carry a common current while secondary windings 13′ and 13″ are connected in series opposition. Transformers 27′ and 27″ are placed face-to-face such that the direction of their primary windings from start to finish is opposite for the two cores, whereupon, a tertiary winding 14 is wound common to both. When a common current flows through primary windings 12′ and 12″, the resultant fluxes $\phi_P'$ and $\phi_P''$ in the two cores are in opposite directions, however, since tertiary winding 14 is common to both cores, current flow through it produces fluxes $\phi_T'$ and $\phi_T''$ in each core in the same direction. Thus, with a current in tertiary 14, one core is driven more into saturation and the other less into saturation. Since the two transformers are magnetically identical, or are made identical by biasing as will be explained hereinafter, the instantaneous voltages across secondary windings 13′ and 13″ with no current in the tertiary are approximately equal and of opposite sign hereby producing a minimum zero output, however, when a D.C. or low frequency current flows in tertiary or control winding 14, it magnetizes the cores as stated above and produces a dissimilarity in their magnetic states, whereupon a resultant output voltage appears across secondaries 13′ and 13″. In this manner, a very small D.C. or low frequency current fed to the tertiary winding controls the release of relatively large pulses. The primary windings 12′ and 12″ serve as the input windings and may be pulsed, for example, at a rate of 3 pulses per second from pulse oscillator 16. Secondary windings 13′ and 13″ serve as the output windings from which the output of the magnetic amplifier may be applied to trigger circuits 24 or 26 depending upon the polarity of the voltage output, as will be hereinafter more fully explained.

As shown in the block diagram of FIG. 1 and as further shown in the circuit diagram of FIG. 3 the magnetic amplifier 11 is driven by pulse oscillator 16 which produces short pulses at approximately the rate of three pulses per second. The imposed circuit requirements make a relaxation oscillator such as 16 an ideal type to drive the magnetic amplifier. When voltage from power supply 15 is applied to input 31 of the oscillator, capacitor 32 begins to charge through resistor 33 and capacitor 34 begins to charge through resistor 35. The time constant of the capacitor-resistor combination 32–33 is roughly 50 times that of the capacitor-resistor combination 34–35 so that capacitor 34 is fully charged well before capacitor 32. This assures that capacitor 34 will deliver constant energy from pulse to pulse. When capacitor 32 has charged to the grid breakdown voltage of cold-cathode tube 36, a grid-cathode discharge begins through resistor 37 which is quickly transferred to the main anode 38. Capacitor 34 now begins to discharge through inductance 39, cathode tube 36 and the load circuit of the oscillator. As capacitors 32 and 34 discharge, the voltage source begins to furnish current to the oscillator which is limited, however, by the large values of resistors 35 and 33. Therefore, the voltage across cathode tube 36 drops rapidly as capacitor 34 discharges, and quickly reaches the extinction potential of the tube. Once the tube is extinguished, conduction cannot begin again until capacitor 32 is again charged to the grid breakdown potential of tube 36.

Retardation coil 39 serves two purposes in that, after the current through it reaches a peak, its inductance forces continued conduction of cold cathode tube even after the capacitor 34 has reached the extinction potential of the tube. This insures discharge of capacitor 34 to below the extinction voltage of the tube before recharging. This in turn, insures positive extinguishment of the tube. Secondly, the inductance of coil 39 limits the peak flow of current in the tube, thus insuring long tube life.

Resistor 41 and capacitors 43 and 44 form a pulse-shaping network. The values of resistor 41 and capacitor 43 are selected for each of the cores having the same core material to yield the optimum current pulse to the primary winding 12 of magnetic amplifier 11.

Figure 4:
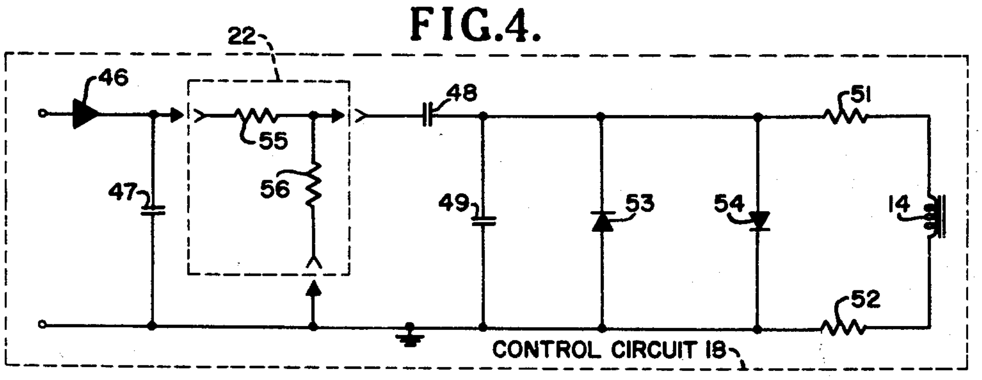
FIG. 4 is a circuit diagram of the control circuit shown in FIG. 1.

As shown in the block diagram of FIG. 1 and as shown more particularly in the circuit diagram of FIG. 4, the signal applied to tertiary winding 14 is obtained from control circuit 18 which, for purposes of illustration, may be assumed to be supplied with a carrier signal 19 having an envelope 20 (see FIG. 5*a*) which varies in magnitude with a period of 10–120 seconds per cycle and which is supplied from a suitable source not shown. Since rectifier 46 conducts current only on the positive half-cycle of the signals, capacitor 47 is charged by a pulsating D.C. current. In the presence of a signal of constant amplitude, blocking capacitor 48 becomes charged to the value of the attenuated, rectified voltage, however, upon a change in the value of the rectified voltage, capacitor 48 will charge or discharge depending upon the polarity of the voltage change. The resulting charging or discharging current is applied through the low-pass filter consisting of capacitor 49, resistor 51 and resistor 52 to the tertiary winding 14 of magnetic amplifier 11.

It is to be understood that a pulsating D.C. signal having a 10–120 second period of oscillation could be applied directly to tertiary 14 in place of the above-described carrier signal.

Rectifiers 53 and 54, connected as a variator, provide for rapid restabilization of the coupling circuit after a large signal has passed therethrough and also limit the current through the tertiary of the magnetic amplifier resulting from a large signal. As shown in FIG. 4, sensitivity plug 22 acts as a voltage divider connected across capacitor 47 and is comprised of resistors 55 and 56 the values of which may be varied in order to obtain greater or lesser attenuation.

Figures 5A, 5B, 5C, 5D:
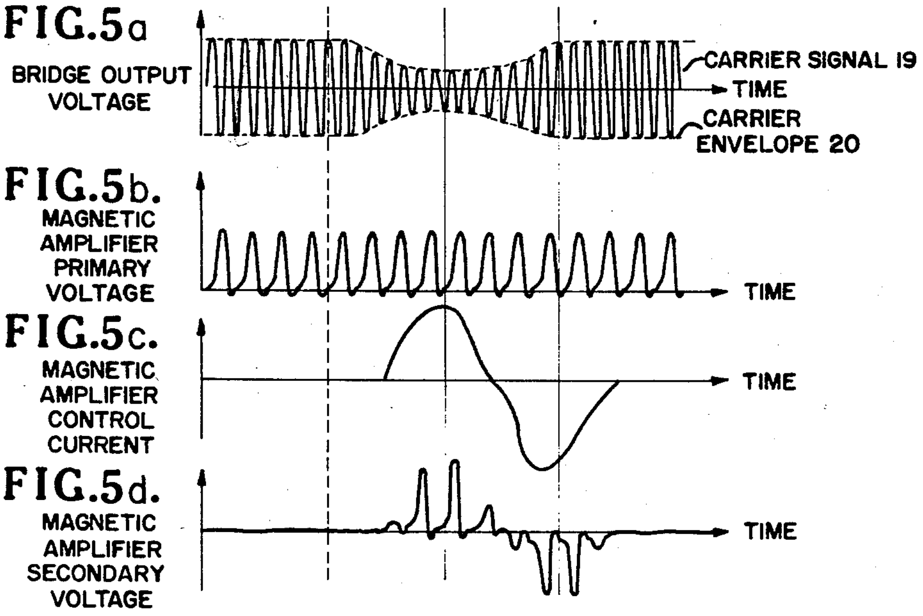

The operation of the magnetic amplifier will now be described with particular reference to FIGS. 5*a* through 5*d*. FIG. 5*a* shows carrier signal 19 having an envelope 20 of constant magnitude to the left of the dotted line which indicates the start of a signal. FIG. 5*b* illustrates the three pulse per second signal which is applied to the primary windings 12′ and 12″ of the amplifier 11. At this time, the tertiary current in the magnetic amplifier is zero as shown in FIG. 5*c* and the secondary voltage from the amplifier is a minimum as shown in FIG. 5*d*. This is due to the fact that signal 19 is rectified in control circuit 18 and the resultant pulsating D.C. voltage charges capacitor 48 to a constant voltage and no current flows in tertiary winding 14. However, upon a decrease in the voltage of carrier envelope 20, capacitor 48 discharges to a new value of the rectified voltage with a resulting discharge current flow through tertiary winding 14 as shown in FIG. 5*c*. Since the primary windings 12′ and 12″ are being pulsed at a rate of 3 pulses per second, the unbalance due to the tertiary current now flowing causes pulses to appear at the secondary as shown in FIG. 5*d* with point A (see FIG. 3) being positive with respect to point B. Conversely, upon an increase in the magnitude of carrier envelope 20, a current is caused to flow in the reverse direction through the tertiary windings of the amplifier and consequently an output voltage appears across the secondary which is negative in polarity. As pointed out hereinbefore, the output voltage from secondary windings 13′ and 13″ may be applied to the grids of cold-cathode tubes in trigger circuits 24, 26 to trigger one of them into conduction. This is accomplished by the use of a double diode polarizing circuit across the output of transformer 59 as shown in FIG. 3.

At this point it should be noted that, when the current flows through the tertiary winding, a pulse appears thereacross as well as at the secondary winding. Current flow in either the secondary or tertiary windings as a result of the output pulse tends to increase the unbalance between the cores. This action is a type of positive feedback which makes the sensitivity of the amplifier dependent upon the output currents of the secondary and tertiary windings. Thus, the sensitivity of the amplifier may be varied by varying the load on either or both of these windings and therefore the value of resistor 57 (see FIG. 3) is selected to provide the desired sensitivity. Increasing the secondary load resistor 57 decreases the sensitivity and resistor 57 also limits the output current of the secondary which prevents "hanging-up"; that is, an unbalance in the cores so great that they fail to return to their original condition after each pulse of primary current. If necessary, the amplifier sensitivity may also be reduced during manufacture of the amplifier by increasing the load on the tertiary winding. For individual magnetic amplifiers with high sensitivities, this is accomplished by placing resistor 58 across the tertiary winding as shown in FIG. 3. This resistor does not shunt the input signal since it is very much larger than the D.C. resistance of the tertiary winding. It decreases the sensitivity by absorbing power in the output pulse which would otherwise have been delivered to output transformer 59.

Due to the practical difficulties in manufacturing two cores which are exactly identical in their magnetic characteristics, it may be desirable to provide an external biasing current to balance the amplifier.

By the use of potentiometer 30 and resistor 40 of biasing circuit 17, this current may be supplied from power source 15, which is also used to operate pulse oscillator 16, and applied to the secondary windings 13′ and 13″ of the amplifier so that the biasing current biases one core in the positive direction and the other core in the negative direction. In this manner, the operating points of the two cores may be made to coincide and the hysteresis curves for each core become substantially identical so that for a zero signal condition in the tertiary, the output voltage is less than plus or minus two volts.

The principal reasons for using a separate tertiary winding are that, first, it affords complete D.C. isolation between the signal input circuit and the bias circuit thus eliminating any effect of one upon the other, and secondly, it is possible to use a large number of turns in the tertiary winding thereby affording maximum sensitivity with a relatively small number of turns for the secondary windings. The tertiary is wound common to both cores rather than on each core separately in order to minimize the total space required by the cores and windings, to reduce stray winding capacitance, and also to reduce the time required for winding the cores. In order to further reduce the winding capacitance in the amplifier, the principal effect of which is to shunt the tertiary winding and thus decrease the output voltage, each winding may be sectionalized into two or more sections. This is particularly important with regard to the tertiary winding due to its large number of turns and is accomplished by winding one half the total number of turns on one half of the core in several layers and then winding the remaining number of turns in several layers on the remaining half of the core. In this manner the capacitance effect may be reduced to a negligible value. The finished amplifier has a cross sectional form as shown in FIG. 6 wherein primary windings 12′–12″, secondary windings 13′–13″ and tertiary winding 14 are shown in their proper relationship to each other and to cores 28 and 29.

Although the schematic drawing of FIG. 2 shows cores 27′ and 27″ as being oppositely wound, it may be desirable in practice to wind the cores in the same direction and to thereafter connect the cores in the appropriate manner so as to obtain the series aiding and series opposing relationships above-described.

On FIG. 7 is shown a complete magnetic amplifier unit according to a preferred form in which the unit has been impregnated with silicone oil and enclosed within a non-magnetic container filled with sand and oil and sealed therein, as will more clearly appear as the description proceeds. The device illustrated and described herein is particularly well suited for use with a marine mine of the type launched from an aircraft at a high altitude without damage thereto as the result of impact of the mine with the surface of the body of water within which it is planted. The device of FIG. 7 has successfully withstood a shock applied thereto in the order of 3,000 *g* without damage to its magnetic, electrical or physical characteristic or impairment of the fine degree of balance originally imparted thereto, which shock is considerably in excess of the magnitude of launching shock received by the mine as it enters the water.

As clearly shown on FIG. 9 the device comprises a metallic core box 61 of non-magnetic material such, for example, as Phosphor bronze of annular configuration within which is stacked the plurality of flat laminations 62 of non-linear magnetic core material interspersed with condenser paper separators 63 of .002 inch in thickness and otherwise of the same dimensions as the laminations. Only sufficient clearance is provided between the laminations and the core box to allow for differences in thermal expansion between the material of the core box and the magnetic material of the cores to insure that the laminations are stress-free under all conditions of service. These clearances are small, especially for the inner diameter of the laminations, for the reason that the laminations must remain concentrically stacked in order to maintain constancy of the mean magnetic path of the core and thereby minimize the turnover effect and furthermore to reduce the play between the core and the box to minimize the shock to which the laminations may be subjected. Any substantial movement of the laminations with respect to each other will change the cross-section of the air gaps therebetween and the total flux in the core. By maintaining the laminations concentrically stacked, however, due to small clearances between the core and its container, this effect is eliminated.

The core box is enclosed by a cover or lid 64 secured thereto at intervals with a length of cord 65 wrapped thereabout. The core box is provided with a plurality of perforations or apertures 66 and is of just sufficient height to prevent substantial axial movement of the laminations therein when the cover is secured thereto. Only sufficient clearance between the laminations and the cover is provided to prevent the application of stresses therefrom to the laminations as the result of temperature variations. The cover is also provided with a plurality of apertures 67 similar to the apertures 66 in the core box.

The core box and cover are wrapped with a layer of porous glass tape 68 to effect a toroid. A primary toroid winding 69 is wrapped around the tape 68 and a secondary winding 71 is thereafter wrapped around the primary winding with a second layer of glass tape 72 disposed therebetween. A third layer of porous glass tape 73 is thereafter wrapped about the secondary winding in toroid configuration thereby to effect a toroidal transformer indicated generally by the numeral 74 and the flexible leads connected to the ends of the windings are brought out through the third layer of porous glass tape to provide a plurality of external electrical connections to the windings.

The primary windings of a pair of toroidal transformers are now connected in series aiding and the secondary windings in series opposing relation to make a magnetic amplifier. When this has been done, the amplifier is tested for magnetic balance by applying pulses to the primary windings and concurrently therewith applying a small direct measured current to the secondary windings of increasing strength until a magnetic balance is obtained. The pair of toroidal transformers are thus brought into matching relationship. The matched pair of toroidal transformers are placed in back-to-back mutually opposing relation with a non-magnetic spacer 75 interposed therebetween and the two units are tied together at intervals with a nylon cord 76 substantially shown on FIG. 8. The placing of the transformers in the proper back-to-back relation has been found to be facilitated by the use of a distinguishing mark placed on the outer peripheral portion thereof before assembly such, for example, as the arrows indicated on FIG. 8.

The amplifier comprising the pair of toroidal transformers 74 when tied together by the length of nylon cord is checked for turnover effect by rotating the amplifier through an angle of 90° and 180° respectively about an axis parallel to the plane of the laminations and recording the output voltage therefrom on an oscilloscope which is connected through a transformer to the secondary windings while pulses are being applied to the primary windings.

A predetermined large number of turns of a tertiary winding 77 are wound about the pair of transformers 74 in such manner the approximate one half of the numbers of turns are wound on one half of the circumferential portion of the transformers and the remaining number of turns are thereafter wound up on the remaining circumferential portion of the transformers thereby to reduce the inter winding capacity of the tertiary winding. When this has been done an additional layer of glass tape 78 is wrapped about the tertiary winding, and the flexible leads connecting the ends of this winding, together with the flexible leads secured to the unconnected ends of the primary and secondary windings, are brought out through this layer of glass tape. The outer end of the glass tape is secured as by a small amount of cement suitable for the purpose supplied thereto. The amplifier unit is now checked for turnover effect and magnetic balance. This is accomplished by applying a small measured direct current to the teritary winding from a high impedance source and measuring the voltage output across the secondary windings concurrently therewith while pulses are being applied to the primary windings.

The magnetic amplifier assembly is now placed in a non-magnetic metallic pot, such as the pot 79 illustrated, composed preferably of Phosphor bronze and having a spacer element 81 of non-magnetic material disposed interiorly on the bottom and a glass fiber lining 82 on the inside wall thereof. The pot is now filled with sand free from salts and metallic particles and preferably of 40 mesh particle size and the sand is packed tightly therein. The pot is provided with a cover 83 having a downwardly turned lip 84 adapted to fit snugly about the pot and be sealed thereto when the cover is assembled therewith. The cover is composed of Phosphor bronze preferably or it may be made of another non-magnetic material if desired, and is provided with a plurality of electrical terminals 85 extending therethrough and insulated therefrom in any well known manner as by the insulating member 86 illustrated. The cover is also provided with a vent or filler hole 87 through which additional sand and a quantity of preheated silicone oil is subsequently introduced into the pot.

The ends of the windings of the magnetic amplifier are connected to flexible leads and thence to the terminals 85 as by soldering the parts together and the cover is placed in the assembled position on the pot and secured in sealed relation thereto as at 88 as by soldering the parts together. The sand is now packed down by agitation or by inserting a tamping tool through the filler hole 87 and sufficient additional sand is added to completely fill the pot after the sand has again been packed.

When this has been done, the amplifying unit is placed in a chamber or impregnator and the air is exhausted therefrom. The impregnator is heated to a temperature of 83° C. and the amplifier assembly is allowed to remain therein for a period of 24 hours to remove all moisture therefrom and subsequently submerged within silicone oil preheated to 83° C. while the assembly is in vacuum. Atmospheric pressure is now introduced to the assembly thereby to impregnate the windings, core structure and sand with oil and the assembly is thereafter removed from the impregnator and the filler or vent hole 87 is sealed as by a metallic disc 89 soldered thereto before the assembly has become cooled to atmospheric temperature.

The pot, it will be noted, is secured to a base member 91 also composed of Phosphor bronze and having a plurality of apertures 92 therein substantially as shown whereby the amplifier unit may be secured to the structural environment with which it is to be used.

From the foregoing disclosure it will be seen that applicants have provided a method for making a unique five winding magnetic amplifier which is five times more sensitive than prior amplifiers, which has easily varable senstivity depending upon the values of resistors 57 and 58, which is compact and of minimum weight, which substantially reduces the capacitance effect of the windings and which provides a desirable high input impedance.

It should be understood that the foregoing disclosure relates only to a preferred embodiment of the invention and that numerous modifications and alternations may be made therein without departing from the spirit and scope of the invention as set forth in the appended claims.

Having thus described the invention, what is claimed is:

1. The method of making and balancing a pulse type shock resistant magnetic amplifier which comprises the steps of:

(*a*) placing a predetermined number of thin laminations of magnetic material of annular configuration interspersed with annular paper separators of like configuration in a closely fitting annular metallic non-magnetic core box having a plurality of perforations therein, (*b*) placing a non-metallic, non-magnetic perforated annular cover on the core box and tieing the cover thereto at intervals with a length of cord, (*c*) toroidally wrapping the box and cover a layer of porous glass tape, (*d*) winding a primary toroid winding and a secondary toroid winding about said tape with a second layer of glass tape between the windings, (*e*) covering the windings with a third layer of porous glass tape in toroid configuration to form a toroidal transformer, (*f*) connecting the primary windings of a pair of toroidal transformers in series aiding and the secondary windings in series of opposing relation, (*g*) placing a magnetically matched pair of toroidal transformers in back-to-back mutually opposing relation with a non-magnetic spacer therebetween and tieing the units together at intervals with cord, (*h*) and winding a predetermined large number of turns of a tertiary winding about said pair of transformers and covering same with an additional layer of porous glass tape.

2. A method according to claim 1 including the following additional steps:

(*i*) placing the magnetic amplifier assembly in a non-magnetic metallic pot having a spacing element disposed interiorly on the bottom and a glass fiber lining on the inside wall thereof, (*j*) filling the pot with sand free from salts or metallic particles and packing the sand tightly therein, (*k*) connecting the windings to terminals extending through a cover for said pot having a vent hole therein and thereafter sealing the cover to the pot, (*l*) placing the assembly in an impregnator heated to a temperature of 83° C. for 24 hours under vacuum and thereafter submerging the assembly while in vacuum in silicone oil preheated to 83° C., (*m*) introducing atmospheric pressure to the assembly while submerged in oil to cause the windings, core structure and sand to be thoroughly impregnated with oil, and (*n*) removing the assembly from the impregnator and sealing the vent hole in the cover before the assembly has become cooled to atmospheric temperature.

3. The method of making and balancing a pulse type shock resistant magnetic amplifier which comprises the steps of:

(*a*) placing a predetermined number of thin laminations of magnetic material of annular configuration interspersed with annular paper separators of like configuration in a closely fitting annular metallic non-magnetic core box having a plurality of perforations therein, (*b*) placing a non-metallic, non-magnetic, perforated annular cover on the core box and tieing the cover thereto at intervals with a length of cord, (*c*) toroidally wrapping the box and cover with a layer of porous glass tape, (*d*) wrapping a primary toroid winding and a second toroid winding about said tape with a second layer of glass tape between the windings, (*e*) covering the windings with a third layer of porous glass tape in toroid configuration to form a toroidal transformer, (*f*) connecting the primary windings of a pair of toroidal transformers in series aiding and the secondary windings in series of opposing relation to make a magnetic amplifier, (*g*) testing the amplifier for magnetic balance by applying pulses to said primary windings and concurrently therewith applying a small direct measured current to the secondary windings of increasing strength until a magnetic balance is obtained, (*h*) placing a magnetically matched pair of toroidal transformers in back-to-back mutually opposing relation with a non-magnetic spacer therebetween and tieing the units together at intervals with nylon cord, (*i*) checking the amplifier for turnover effect by rotation through 90° and 180° about an axis parallel to the plane of the laminations and recording the output voltage therefrom on an oscilloscope connected by a transformer to the secondary windings while pulses are being applied to the primary windings, and (*j*) winding a predetermined large number of turns of a tertiary winding in two sections abut said pair of transformers and covering same with an additional layer of porous glass tape.

4. A method according to claim 3 including the following additional step:

(*k*) applying a small measured direct current to the tertiary windings from a high impedance source and measuring the voltage output across the secondary winding concurrently therewith.

5. A method according to claim 4 including the following additional steps:

(*l*) placing the magnetic amplifier assembly in a nonmagnetic metallic pot having a spacer element disposed interiorly on the bottom and a glass fiber lining on the inside wall thereof, (*m*) filling the pot with sand free from salts or metallic particles and packing the sand tightly therein, (*n*) connecting the windings to terminals extending through a cover for said pot having a vent hole therein and thereafter sealing the cover to the pot.

(*o*) introducing additional sand into the pot through the vent hole and tamping the sand therein as required to fill the pot with tightly tamped sand, (*p*) placing the dry assembly in an impregnator heated to a temperature of 83° C. and maintaining a vacuum thereon for 24 hours and thereafter submerging the assembly while in vacuum with silicon oil preheated to 83° C., (*q*) introducing atmospheric pressure to the assembly thereby to impregnate the windings, core structure and sand with oil and, (*r*) removing the assembly from the impregnator and sealing the vent hole in the cover before the assembly has become cooled to atmospheric temperature.

References Cited by the Examiner

UNITED STATES PATENTS

| | | | |
|---|---|---|---|
| 2,344,294 | 3/44 | Evans | 29—155.56 |
| 2,561,456 | 7/51 | Zwelling | 29—155.56 |

FOREIGN PATENTS

| | | |
|---|---|---|
| 949,896 | 9/49 | France. |

WHITMORE A. WILTZ, *Primary Examiner.*

REUBEN EPSTEIN, *Examiner.*